United States Patent
Rotenberg

(10) Patent No.: US 8,423,445 B2
(45) Date of Patent: Apr. 16, 2013

(54) METHOD AND SYSTEM FOR THREE-DIMENSIONAL PRESENTATION OF FINANCIAL DATA

(76) Inventor: Edward Rotenberg, Groton, MA (US)

(*) Notice: Subject to any disclaimer, the term of this patent is extended or adjusted under 35 U.S.C. 154(b) by 0 days.

(21) Appl. No.: 13/158,181

(22) Filed: Jun. 10, 2011

(65) Prior Publication Data

US 2012/0030074 A1 Feb. 2, 2012

Related U.S. Application Data

(60) Provisional application No. 61/367,896, filed on Jul. 27, 2010.

(51) Int. Cl.
*G06Q 40/00* (2012.01)

(52) U.S. Cl.
USPC .............................. 705/36 R; 705/35; 705/37

(58) Field of Classification Search ............... 705/35, 705/36 R, 37
See application file for complete search history.

(56) References Cited

U.S. PATENT DOCUMENTS

| | | | | |
|---|---|---|---|---|
| 5,774,878 | A * | 6/1998 | Marshall | 705/36 R |
| 6,734,848 | B2 * | 5/2004 | Bires | 345/419 |
| 6,850,906 | B1 * | 2/2005 | Chadha et al. | 705/36 R |
| 7,248,258 | B2 * | 7/2007 | Acosta et al. | 345/419 |
| 7,250,951 | B1 * | 7/2007 | Hurley et al. | 345/440 |
| 7,408,554 | B2 * | 8/2008 | Lawson et al. | 345/442 |
| 7,483,917 | B2 * | 1/2009 | Sullivan et al. | 1/1 |
| 7,756,896 | B1 * | 7/2010 | Feingold | 707/791 |
| 7,825,927 | B2 * | 11/2010 | Kim et al. | 345/419 |
| 7,890,406 | B2 * | 2/2011 | Markov et al. | 705/36 R |
| 8,237,703 | B2 * | 8/2012 | Shenkar et al. | 345/419 |
| 2002/0163546 | A1 * | 11/2002 | Gallo | 345/848 |
| 2002/0178096 | A1 * | 11/2002 | Marshall | 705/35 |
| 2003/0080962 | A1 * | 5/2003 | Erickson et al. | 345/440 |
| 2003/0088448 | A1 * | 5/2003 | Tan | 705/7 |
| 2004/0030741 | A1 * | 2/2004 | Wolton et al. | 709/202 |
| 2004/0109031 | A1 * | 6/2004 | Deaton et al. | 345/848 |
| 2005/0128201 | A1 * | 6/2005 | Warner et al. | 345/474 |
| 2006/0044307 | A1 * | 3/2006 | Song | 345/419 |
| 2006/0241949 | A1 * | 10/2006 | Tobias et al. | 705/1 |
| 2006/0288284 | A1 * | 12/2006 | Peters et al. | 715/700 |
| 2007/0038543 | A1 * | 2/2007 | Weinstein | 705/36 R |
| 2007/0185904 | A1 * | 8/2007 | Matsuzawa et al. | 707/104.1 |
| 2008/0243521 | A9 * | 10/2008 | Coale et al. | 705/1 |
| 2010/0057618 | A1 * | 3/2010 | Spicer et al. | 705/64 |
| 2010/0069035 | A1 * | 3/2010 | Johnson | 455/404.1 |
| 2010/0325307 | A1 * | 12/2010 | Roos | 709/234 |
| 2011/0187710 | A1 * | 8/2011 | Giovinazzi et al. | 345/419 |
| 2011/0282716 | A1 * | 11/2011 | Fenstermaker et al. | 705/7.39 |
| 2012/0030193 | A1 * | 2/2012 | Richberg et al. | 707/719 |

OTHER PUBLICATIONS

Caplinger, G (1986). Graphical Database Browsing. Bell Communications Research.*
User Guide to PV-WAVE 7.5 (2001).*

(Continued)

*Primary Examiner* — Elaine Gort
*Assistant Examiner* — Peter L Ludwig
(74) *Attorney, Agent, or Firm* — Schwegman Lundberg & Woessner, P.A.

(57) ABSTRACT

A computerized method and system for displaying financial data, is based on geometric three-dimensional (3D) model. The geometric 3D model consists of geometric 3D components and geometric 3D interconnections between components. Components represent financial assets and interconnections represent relations between assets. Component's volume is proportional assets' parameters values. Volume of interconnections proportional covariance or correlation values between assets. The generalized multi-dimension and multi-tier model may be applied for presentation of financial data.

19 Claims, 12 Drawing Sheets

OTHER PUBLICATIONS

Examiner defines "relationships" as "the state of being connected or related". See World English Dictionary, 2009.*

Examiner defines "interconnection" as "to be or become connected or interrelated." See Collins English Dictionary, 2012.*

Tegarden, D. (Jan. 1999). Business Information Visualization, Tutorial. Communications of the Association for Information Systems 1(4).*

Diether, K.B. (Dec. 29, 2009, date obtained from www.archive.org), Mean Variance Analysis, Fisher College of Business.*

PV-Wave Point & Click; Visual Data Analysis Software (1991). Precision Visuals, Inc.*

Kiviluoto, K. Comparing 2D and 3D Self-Organizing Maps in Financial Data Visualization. Lab. of Computer and Information Sci at Helsinki Univ. of Tech.*

Sylvester, B. (2008). The Visualization of Financial Data: a review of information visualization tolls in the financial data domain.*

Li, Jia (2002). Three dimensional shape modeling: segmentation, reconstruction and registration. Dissertation.*

Knowlton, K. Computer-Aided Definition, Manipulation and Depiction of Objects Composed of Spheres. Bell Labs.*

* cited by examiner

METHOD AND SYSTEM FOR THREE-DIMENSIONAL PRESENTATION OF FINANCIAL DATA

RELATED APPLICATION

This application claims priority to U.S. Provisional Application Ser. No. 61/367,896 entitled "METHOD AND SYSTEM FOR THREE-DIMENCIONAL PRESENTATION OF FINANCIAL DATA", filed Jul. 27, 2010, which is incorporated herein by reference.

TECHNICAL FIELD

The present invention relates to financial data modeling and data visualization.

BACKGROUND ART

Currently visualization in finance is mostly limited to two dimensional data representations. There have been some attempts to visually represent financial data in three-dimensional space. The interesting approach had been used in U.S. Pat. No. 7,472,084, where the visual model use correlations presented as a measure of distance or angle indicative of the relationship between the assets.

In the case of financial data we are dealing with abstract information. It has no inherent dimensionality in the geometric sense like data that is "naturally" structured to represent two dimensional—2D(x, y) or three dimensional—3D(x, y, z) objects, where x, y, z—object's coordinates. In this type of visualization 2D or 3D coordinates accompany each piece of data in order to correctly place/visualize data.

It is also important to mention that two-dimensional space is not a natural place for human perception: humans by default position 2D images in 3D space. Papers/books/computer's 2D screens that we have now are the temporarily compromises. We can pack more information, and more complex relationships into 3D. Displaying multi-assets/multi-connections investment information in 2D inherently introduces visual ambiguity on an interconnection level even for small quantities of components.

The complexity of creation of a visual representation conveying the right message is thoroughly reflected in the following statement: "Robust Communication: In order to inform, persuade, and stimulate (or fatigue), messages to the visual system must have integrity, credibility, and excitement (or lack of excitement). Making the message available is sufficient for some applications, but for most, the message must be both available and easy to understand." (MIT Media Lab)$^{ibid}$ An adequate visualization of financial data must at a minimum demonstrate the multi-component nature of financial data and their primary relationships. Using three-dimensional space creates the potential to present all financial data and their primary relationships in a single three-dimensional model.

The main challenge of visualization is to realize the above three-dimensional space—model potential. The secondary challenge is to satisfy principles of Robust Communication stated above. The optimal visual implementation will let user to view and evaluate the state of a whole entity as well as state of its components and components inter-relationships in a single view. The above features will give users long due functionality to discover, to select and to compare using a lot more information than in 2D or in spreadsheet cases.

SUMMARY

A computerized method of displaying financial data includes receiving the financial data in an electronic format. In a first computer process, the financial data is analyzed to identify categories associated with the data to produce parsed financial data. In a second computer process, the parsed financial data is used to populate a three-dimensional data model. The populated data model is stored on a computer readable storage device. A graphics engine is used to display the populated data model.

In another embodiment, a non-transitory digital storage medium is encoded with instructions, which, when loaded into a computer establishes computer processes, for displaying financial data. The processes include receiving the financial data in an electronic format, analyzing the financial data to identify categories associated with the data to produce parsed financial data, using the parsed financial data to populate a three-dimensional data model, storing the populated data model on a computer readable storage device, and using a graphics engine to display the populated data model.

BRIEF DESCRIPTION OF THE DRAWINGS

The foregoing features of the embodiments will be more readily understood by reference to the following description, taken with reference to the accompanying drawings, in which:

FIG. 3A is a screenshot of a Generic 3D Geometric Model.

FIG. 3B is a screenshot of an enhanced diversification view of The Generic 3D Geometric Model.

FIG. 4 is a screenshot of one embodiment that illustrates a first tier corresponding to decomposition of investment portfolio to asset class type of components.

FIG. 5 is a screenshot of a further embodiment that illustrates a second tier corresponding to decomposition of one of the first tier asset classes to individual components.

FIG. 6 is a screenshot of the second embodiment in second tier state with additional information about one of the assets.

FIG. 7 is a variant of FIG. 6, showing another way to present additional information about one of the assets.

FIG. 8 is a screenshot displaying a special mode for researching relationships dependencies among components of an investment portfolio model.

FIG. 9 is a screenshot displaying a window for selection views (dimensions).

FIG. 10 is a screenshot illustrating one of the methods by which General Model communicates to user parameters having negative implications.

DETAILED DESCRIPTION OF SPECIFIC EMBODIMENTS

Definitions. As used in this description and the accompanying claims, the following terms shall have the meanings indicated, unless the context otherwise requires:

A "portfolio" is a collection of assets, which may, but need not, be commonly owned.

A "component" of a portfolio is a single asset, or a set of assets (asset class), within the portfolio, selected according to criteria established by the user.

A "variable" associated with a portfolio is a financial parameter describing portfolio itself or portfolio's component. Variables include, for example, return, gain, loss, risk, earnings per share, etc.

Figure 9:
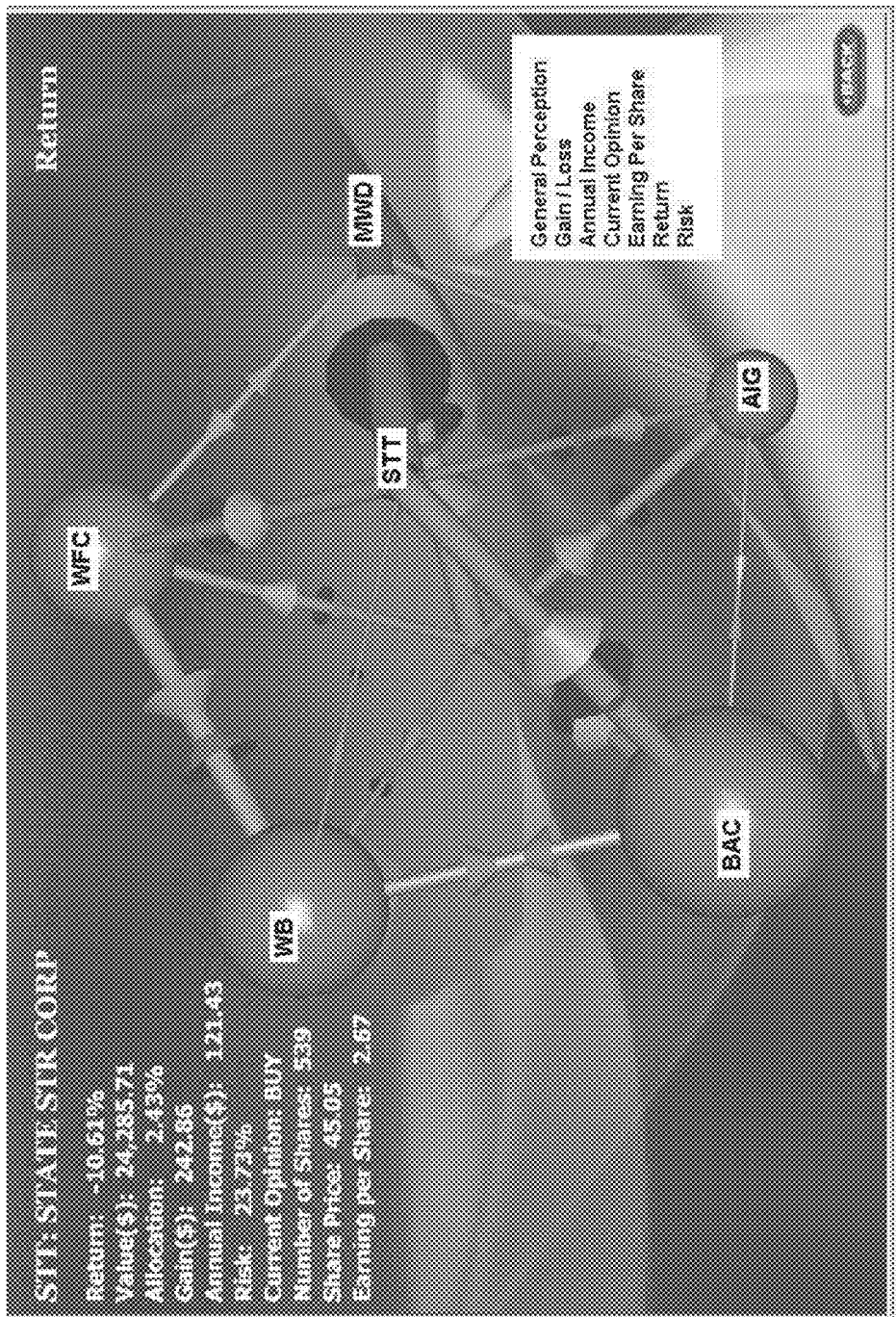

A "dimension" in a representation, according to embodiments of the present invention, is a view of the representation in which are displayed values of a selected variable associated with items displayed in the view. For example, FIG. 9 is a view showing the Return dimension.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments described below, a computerized method of displaying financial data includes receiving the financial data in an electronic format. The financial data is analyzed to identify categories associated with the data to produce parsed financial data. The parsed financial data is used to populate the three-dimensional data model. The populated data model is stored on a computer readable storage device. A graphics engine is used to display the populated data model.

Figure 3A:
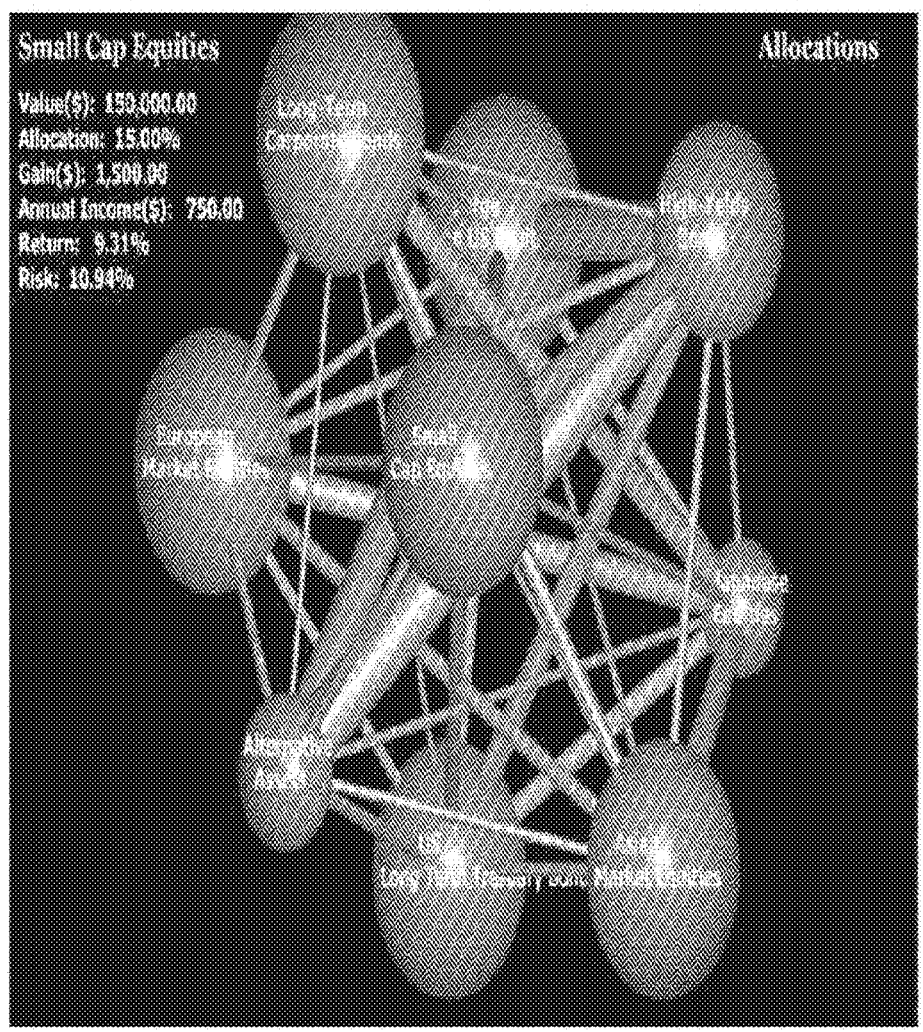
FIGS. 3A, 3B, 4, 5, 6, 7, 8, 9, and 10 are representations of a display associated with a computer running a computer program implementing example embodiments of the present invention.

The three-dimensional data model consists of geometric 3D components and geometric 3D interconnections between components. Components represent financial assets and interconnections represent relations between assets. Each component has relations with all other components. Component's volume is proportional assets' parameters values. Volume of interconnections proportional covariance or correlation values between assets. We call the above model The Generic 3D Geometric Model. FIG. 3A presents The Generic 3D Geometric Model where components are implemented as spheres and links are implemented as cylinders. The generalized multi-dimension and multi-tier model may be applied for presentation of financial data.

More, particularly, a system and method in accordance with embodiments of the invention utilize in their core the three-dimensional geometric model to provide representation of financial data. For further reference we will use name General Model for our three-dimensional geometric model.

General Model is based on The Generic 3D Geometric Model or derived from it The Risk 3D Geometric Model where dependencies between components and interconnections govern by formula (1).

The following is the explanation of The Risk 3D Geometric Model. Let's consider an investment portfolio return variance (risk) formula [1]:

$$\sigma_p^2 = \sum_{i=1}^{n} \omega_i^2 \sigma_i^2 + \sum_{i=1}^{n} \sum_{j=i+1}^{n} 2\omega_i \omega_j \text{cov}(i, j) \quad (1)$$

Where: i=1, 2, ..., n; n—number of components (assets) in portfolio; $\omega_i$ is the weighting of component (asset) in portfolio; $\sigma_i$—asset's return standard deviation, cov(i, j)—price covariance between components i and j.

The first part of the formula is the sum of risks contained in components (assets). The second part is the sum of risks contained in inter-assets relations. The corresponding to formula (1) The Risk 3D Geometric Model consists of two parts: the components (assets) part and the interconnections part. In the component part, the volume of the each 3D geometric figure representing particular component equal value of the corresponding member in the first sum of the formula (1). In the interconnections part, the volume of the each geometric figure representing particular interconnection between two components equal value of the corresponding member in the second sum of the formula (1).

We can presents the second part of formula (1) as $$\sum_{i=1}^{n} \sum_{j=i+1}^{n} 2\sigma_i \sigma_j \rho_{ij} \quad (2)$$

Where $\rho_{ij}$ is correlation coefficient between components i and j. Therefore, we can substitute term correlation for term covariance. We use both terms on equal base further.

The generalization of formula (1) can be presented in the matrix form:

$$X^T A X \quad (3)$$

where X is n-dimensional vector and A is symmetric matrix. Therefore The Risk 3D Geometric Model is applicable for visualization of the type (3) equations.

It is impossible to project The Generic 3D Geometric Model in 2D space without introducing visual ambiguity on interconnection level even for small quantities of components.

Figure 3B:
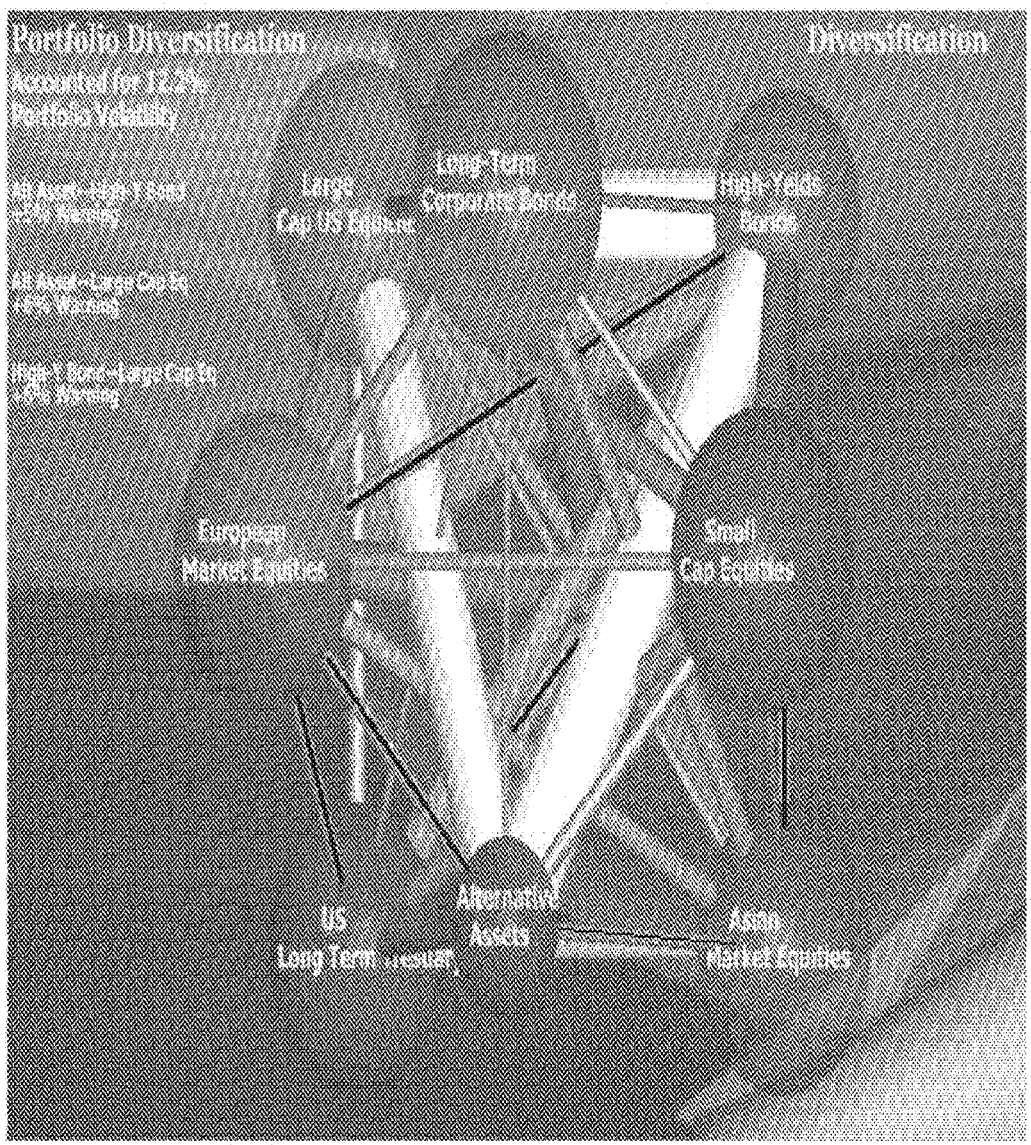

The correct conversion of the risk formula (1) to The Risk 3D Geometric Model created 3D portfolio risk object. This objects shared features of the class of natural 3D objects having 3D coordinates for each part. One can see internal structures, malfunctioning parts, etc. The example on FIG. 3B presents enhanced diversification view. Red color (presented here as white color due to black and white drawing limitations) outlines malfunctioning interconnections between three assets classes (blue color denotes negative covariance value).

The example on FIG. 3B shows the important feature of The Risk 3D Geometric Model: an investor can visually estimate level of portfolio diversification presented as the visual part of investment portfolio internal structure. To explain this we start from the definition of portfolio diversification. Diversification means reducing risk by investing in a variety of assets with different market behavior. The value of price covariance/correlation between two assets is the measure of their similarity in market behavior. Diameter of connection link between two assets proportional value of price covariance/correlation between assets. Therefore, diameter of connection link proportional assets similarity in market behavior. Looking at connections links investor could visually estimate level similarity in market behavior of connected assets and then estimate level of diversification of a whole portfolio. We even can attach number to it: the overall portfolio diversification equal value of the second sum in formula (1):

$$\sum_{i=1}^{n} \sum_{j=i+1}^{n} 2\omega_i \omega_j \text{cov}(i, j) \quad (4)$$

Minimizing (4) we can improve portfolio diversification. In case of negative covariance we use blue color (presented here as black color stripe on negative connection links) to designate corresponding connection links (FIG. 3B). Assets with negative covariance occur a lot less often in portfolio. But they affect overall visual estimation. Visually, the best diversified portfolio has only blue color connections. Next level of diversification is a combination of blue color connections and small diameter's positive connections. It's important to notice also that we can automatically show the deviation in portfolio diversification on component level from target values set by investor (see red color (presented here as white color due to black and white drawing limitations) links on screenshot FIG. 3B) or whole portfolio diversification from a benchmark.

General Model is the result of application The Generic 3D Geometric Model to financial domain. General Model includes the following components and behaviors:

(A) The set of three-dimensional geometric figures (Set A) to correspond different elements of financial data;
(B) The set of connections (Set B) between members of Set A in the form of three-dimensional geometric figures to show relationships among Set A members;
(C) The model use rules (Set of Rules C) to assign colors, sizes and orientations to Set A & Set B geometric figures to present parameters of financial data;
(D) Each 3D geometric figure included in Set A & Set B may contain (linked to) an unstructured set of other types of financial data representations;
(E) The model (ABCD) has multiple views or dimensions. Each dimension corresponds to a single variable of a variables combination from a set of variables describing financial data;
(F) The model has a nested multi-tier structure: each member of Set A may be represented by the model with the above (ABCDEF) features. In this way the model starts a next tier for a certain member of Set A. Using this approach further we can create any number of tiers corresponding financial data complexity.

In various embodiments, we employ different manners of mapping financial data and their relationships into Set A & Set B, use different three-dimensional geometric figures in Set A & Set B, use different instructions to create Set of Rules C, and present model nested structure and dimensions.

In a first embodiment of the invention, we use 3D spheres in Set A and 3D cylinders in Set B. The Set B includes all relationships of each member of Set A with all other members of Set A. In construction of Rules C, we employ different colors and sizes for members of Set A & Set B.

In a second embodiment of the invention, we use 3D spheres in Set A and 3D cylinders with contiguous 3D cones in Set B. The Set B includes all relationships of each member of Set A with all other members of Set A. Orientation and color of cones on cylinders corresponds to different types of relationships within the financial data. In construction of Rules C we employ different colors and sizes for members of Set A & Set B.

In a third embodiment of the invention, we use 3D spheres in Set A and 3D spring coils in Set B. The Set B includes all relationships of each member of Set A with all other members of Set A. In construction of Rules C we employ different colors and sizes for members of Set A & Set B.

In a fourth embodiment of the invention, we use previous embodiments to present only that part of financial data having a deviation that exceed a set of threshold values defined by the user's criteria.

Figure 1:
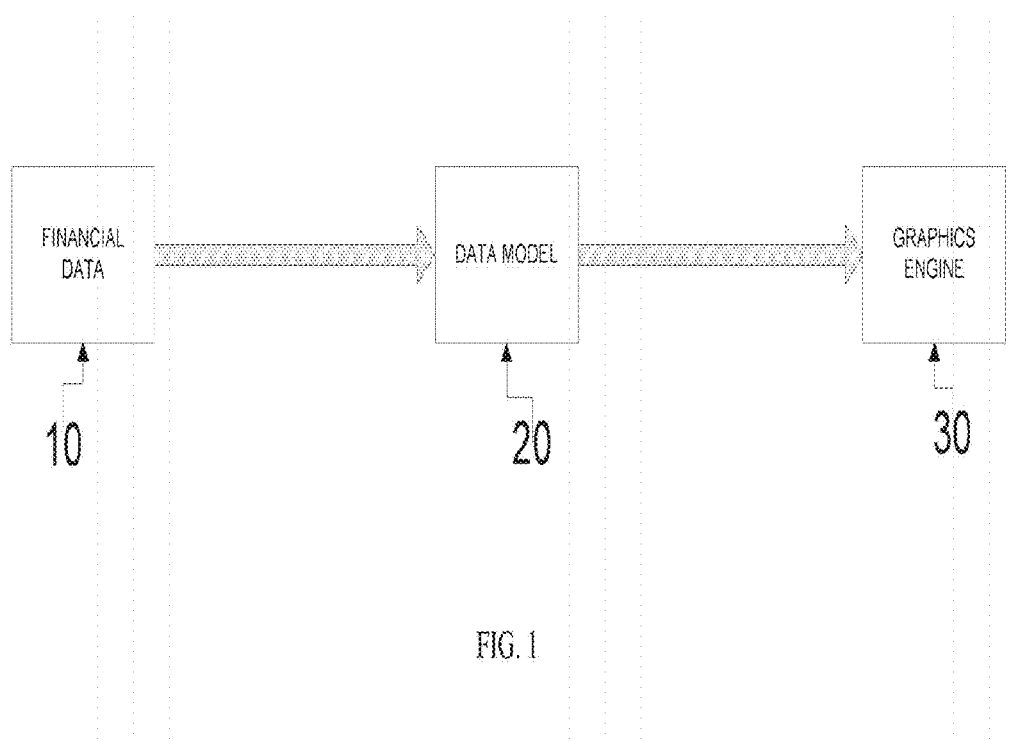
FIG. 1 is a block diagram of the system for 3D presentation of financial data according example embodiments.

FIG. 1 is a block diagram of a system for 3D presentation of financial data according to various embodiments of the present invention. Various embodiments depend on establishing a 3D model in which components of the portfolio are represented as geometric entities in the model. In one embodiment the 3D model is presented using a graphical engine implemented in the Open GL environment, with the software written in C++. The logical processes described have been implemented in a personal computer running the Windows XP operating environment; however, a very wide range of computational environments may be used. The processes described here therefore may be used in such a computing environment or in other computing environments. In accordance with embodiments herein, as illustrated in FIG. 1, Financial Data 10 is used to populate Model 20, and a Graphics Engine 30 displays the 3D Model 20.

Figure 2:
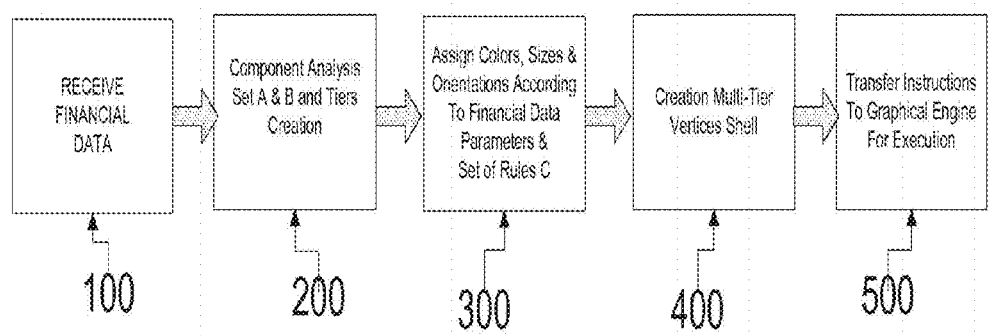
FIG. 2 is a flowchart illustrating logical level of data processing according example embodiments.

FIG. 2 is a flowchart illustrating logical level of data processing according to various embodiments of the present invention. In process 100 of FIG. 2, The System receives Financial Data that will be used in populating the model. In process 200 of FIG. 2, calculations of data for Set A and Set B (as described in the Summary of Embodiments above) are performed for each by using Components Analysis of financial data. In process 300, calculations are performed for the data model by assigning colors, sizes and orientations for members of Set A and B according to financial data parameters and Set of Rules C. In process 400, the System calculates vertices locations in 3D space in order to place members of Set A. In process 500 of FIG. 2, the System transfers all geometric elements of 3D model to the Graphics Engine for execution.

FIGS. 3A, 3B, 4, 5, 6, 7, 8, 9, and 10 are representations (hereinafter called "screenshots") of a digital display associated with a computer in which software implementing an embodiment of the present invention is running. The computer program implements the first and the second embodiments (illustrated in FIG. 3-FIG. 10) with examples using financial data representing an investment portfolio. Using the graphics engine 30 capabilities, the graphical representations of financial data may be turned and viewed from different angles, just like mechanical structures, providing further three dimensional viewing capability and reducing potential ambiguity that might arise from simply viewing a static two dimensional image of the three dimensional structure.

FIG. 3A is a screenshot of The Generic 3D Geometric Model as described above.

FIG. 3B is a screenshot of enhanced diversification view of The Generic 3D Geometric Model described above.

Figure 4:
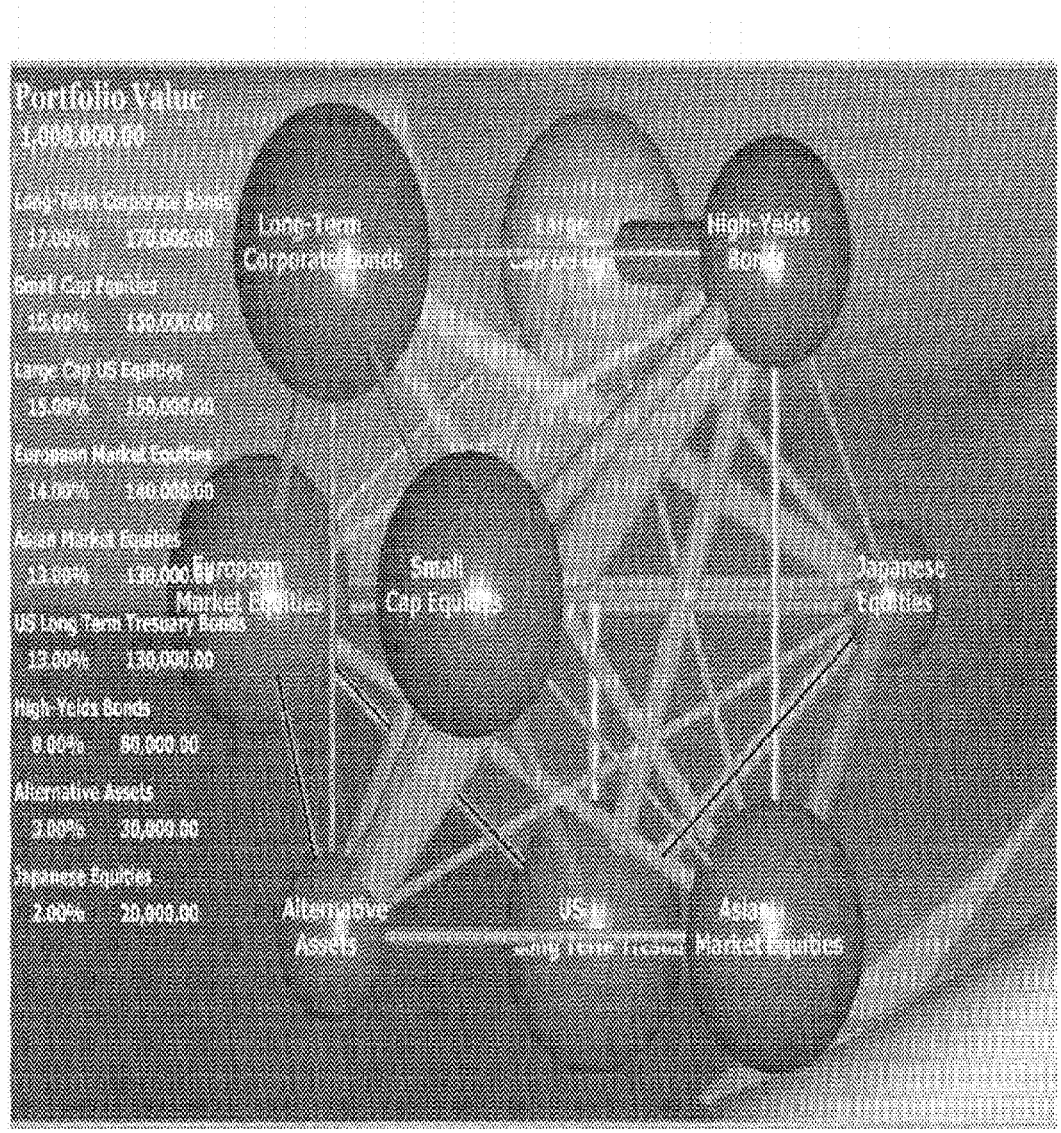

FIG. 4 is a screenshot of the first embodiment. It presents the first tier corresponding to a decomposition of the investment portfolio into asset class type of components. The Set A consists of nine members expressed as spherical geometric figures. The color and size of each sphere communicate to user values of parameters of a corresponding asset class. The parameters may correspond to performance of the underlying investment in one embodiment. A green color indicates good performance, yellow color indicates moderate performance and red color is bad performance (we use different levels of gray color as substitute designations for green, yellow and red colors on these black and white pictures). Different color schemes may be used as desired by a user. In further embodiments, other attributes may be used to represent values of parameters. The size of a sphere may be proportional to relative asset allocation size. The Set B uses covariance values for expressing relationships between members of the Set A. The Set B includes all covariance values of each member of the Set A with all other members of the Set A. The diameter of each link cylinder is proportional to covariance values amended by weight coefficients. A blue color of a link cylinder corresponds to a negative covariance values in one embodiment. Link cylinders located inside the model (vertices shell) are made semitransparent (or not visible at all) in order to comply with human visual perception limits. The transparency of the links may vary as a user manipulates the model image to view it from different angles and perspectives, including navigating through the model image in some embodiments, such that each link and sphere may be investigated by the user.

Figure 5:
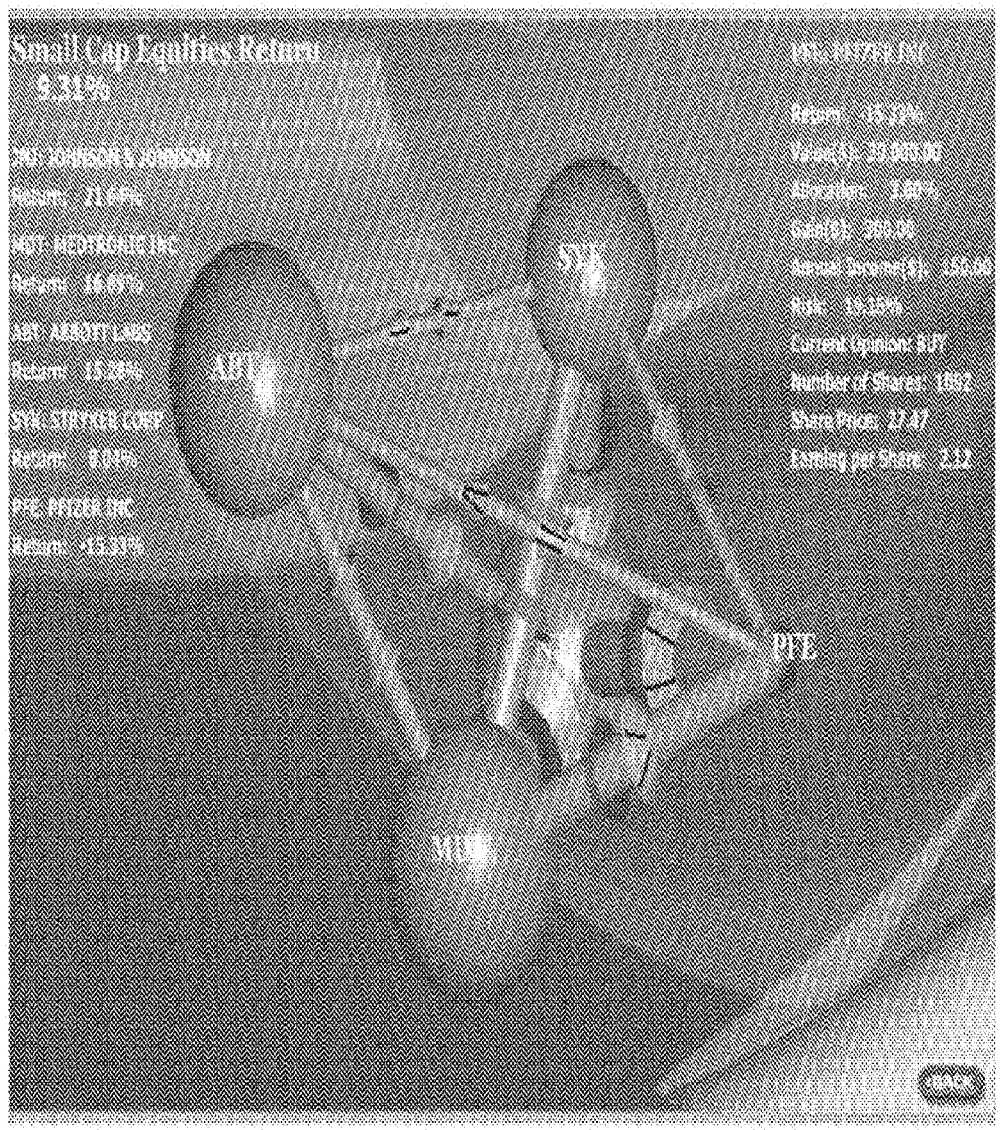

FIG. 5 is a screenshot of the second embodiment. It presents the second tier corresponding to decomposition of one of the first tier asset classes to individual components. The Set A consists of six members (in our case six stocks comprising the asset class Small Cap Equities) expressed as spherical geometric figures. The color and size of each sphere communicate to the user the value of parameters of a corresponding asset (in our case stock). Green color indicates good performance, yellow color indicates moderate performance and red color is bad performance (we use different levels of gray color as substitute designations for green, yellow and red colors on these black and white pictures). The size of a sphere is proportional to relative return value. The Set B uses covariance values for expressing relationships between members of the Set A. The Set B includes all covariance values of each member of the Set A with all other members of the Set A. The diameter of each link cylinder is proportional to a covariance values amended by weight coefficients. The blue color of cones (cones with black stripes here on black and white picture) may be used as the other way to represent a negative correlation value.

Figure 6:
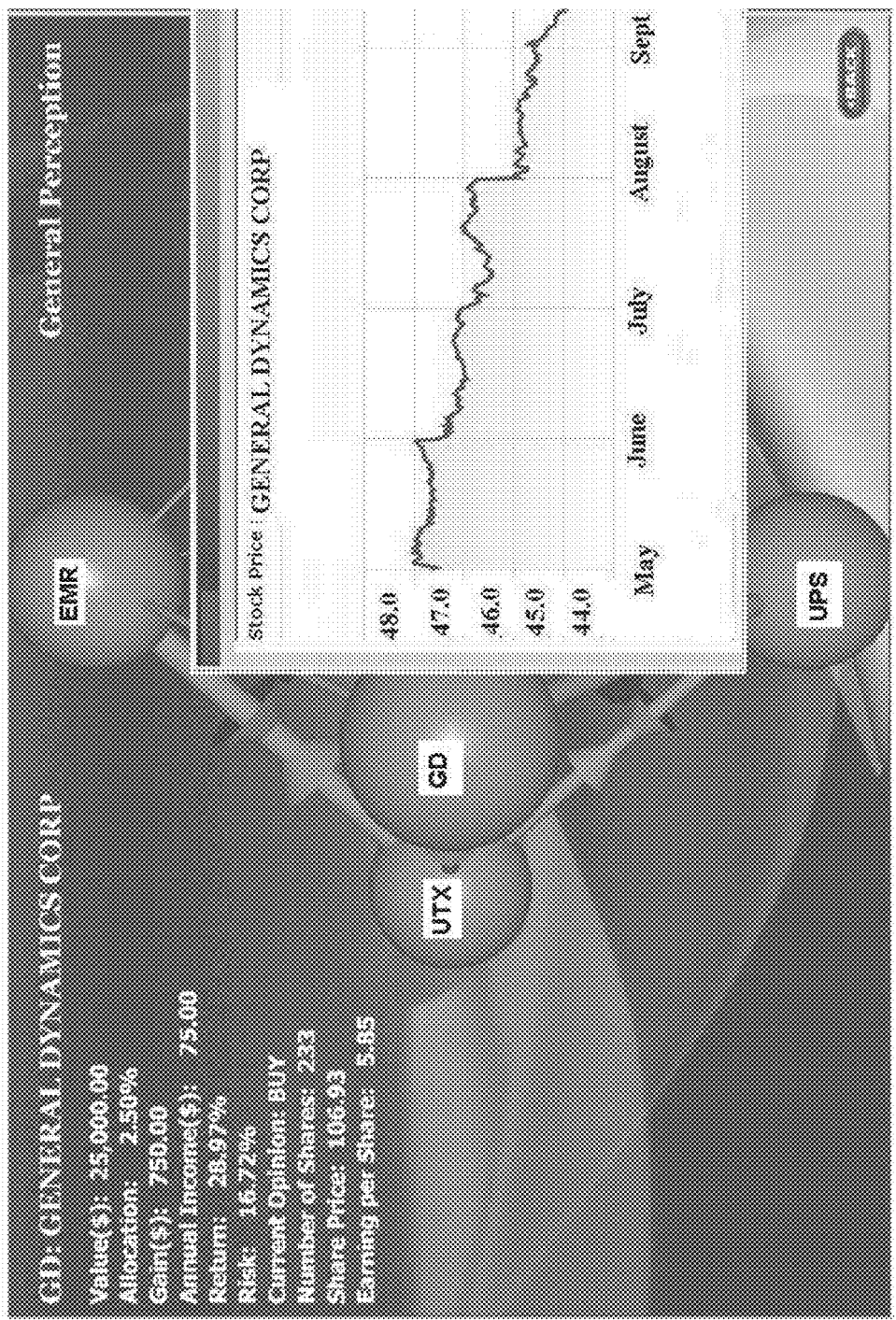

FIG. 6 is a screenshot of the second embodiment in second tier state with additional information about one of the assets. The presentation of additional information is achieved using feature D of General Model: "Each 3D geometric figure included in Set A & B may contain an unstructured set of other types of financial data representations". Here we have the additional information in the form of a table with numerical information about the General Dynamics Corp stock in. The information can be invoked on user demand by a mouse click on the sphere representing "General Dynamic" stock. The sphere is a graphical user interface element with an associated link to the table in one embodiment. The table may pop up automatically as the cursor is moved over the sphere, or may be obtained by clicking on the sphere in other embodiments.

Figure 7:
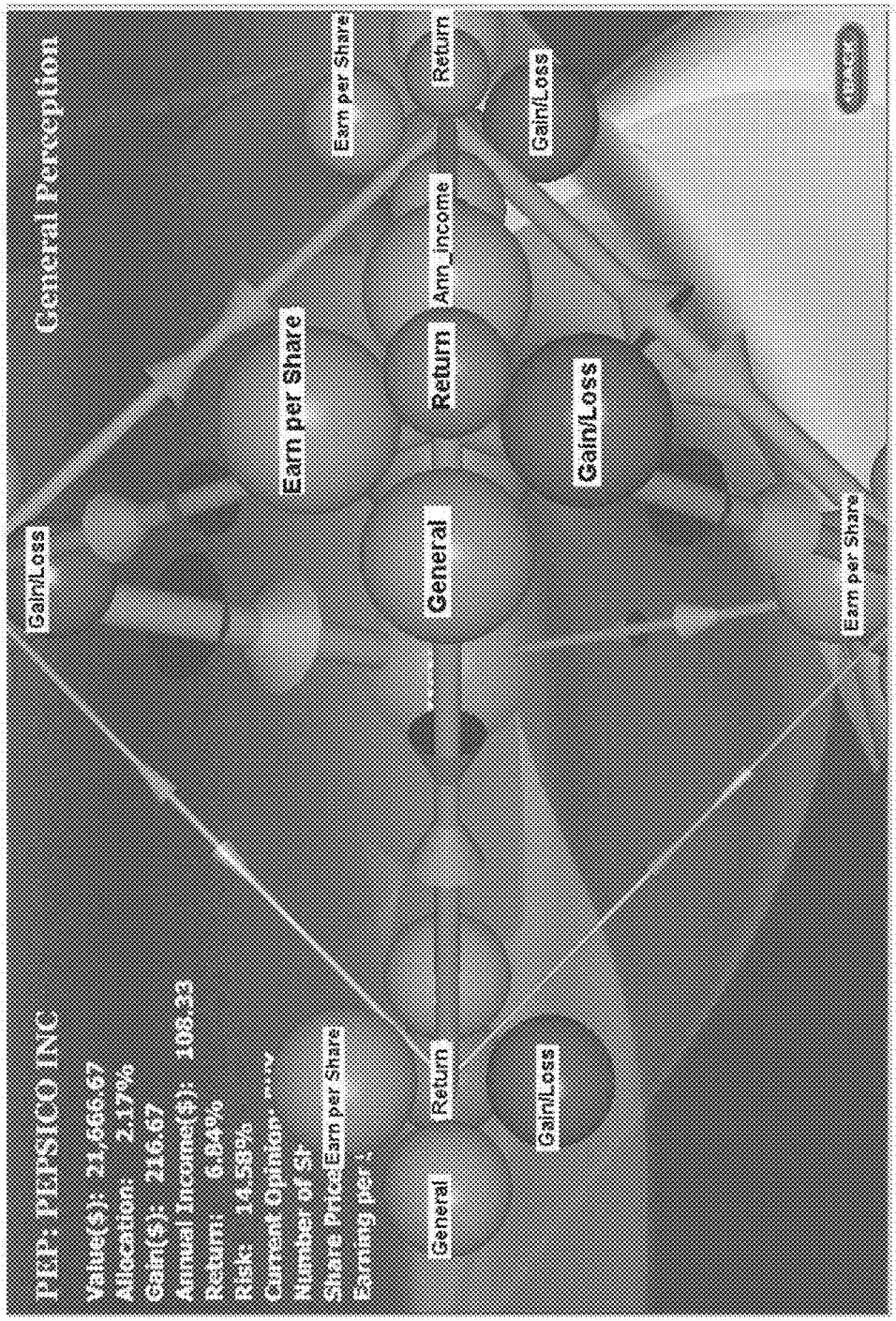

FIG. 7 is the variant of FIG. 6, showing another way to present additional information about one of the assets. Here we use parametrically sized and colored spheres to represent multiple asset parameters such as earnings per share, return, general information, gains, losses, risk, and others. Each of these spheres may also be used to call up a table with even further information regarding the asset parameters. The information can be invoked on user demand by a mouse click or pass over of the sphere representing the asset of interest.

Figure 8:
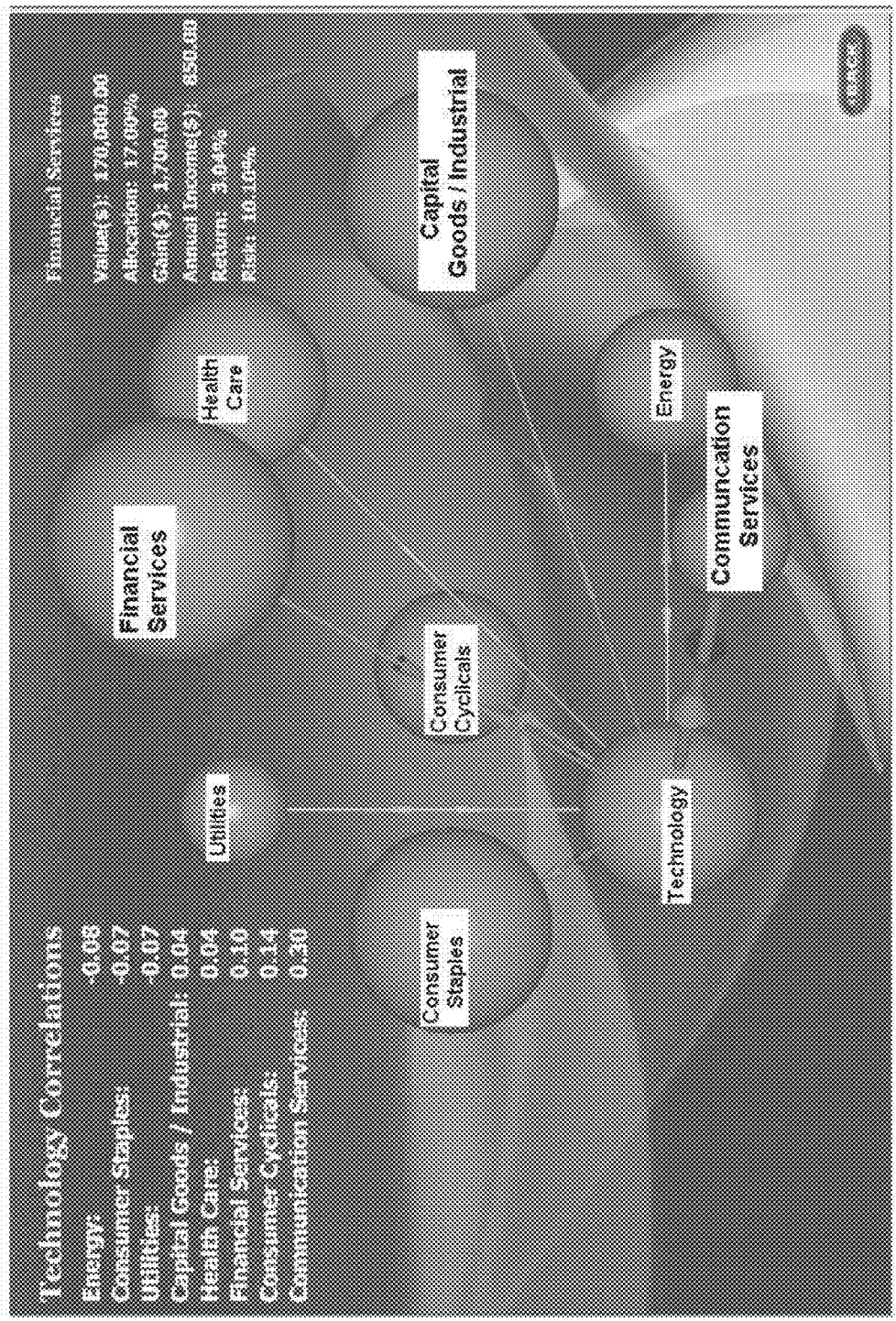

FIG. 8 is a screenshot displaying a special mode for researching relationships dependencies among components of an investment portfolio model. It presents dependencies (covariance values amended by weight coefficients) between asset classes on the tier one and components of asset classes on the tier two. The diameter of each link cylinder is proportional to a covariance values amended by weight coefficients. The blue color of cones (cones with black stripes here on black and white picture) corresponds to a negative correlation value.

FIG. 9 is a screenshot displaying a window for selection views (dimensions). This figure illustrates an implementation of feature E of the General Model: "The model (ABCD) has multiple views or dimensions. Each dimension correspond single variable of variables combination from a set of variables describing financial data." An investment portfolio model may be viewed in the multiple dimensions. For example: General Perception, Gain/Loss, Annual Income, Current Opinion, Risk and Return. In each dimension we use distinctive colors, sizes and orientations for presentation of financial data parameters. This figure represents the first tier.

Figure 10:
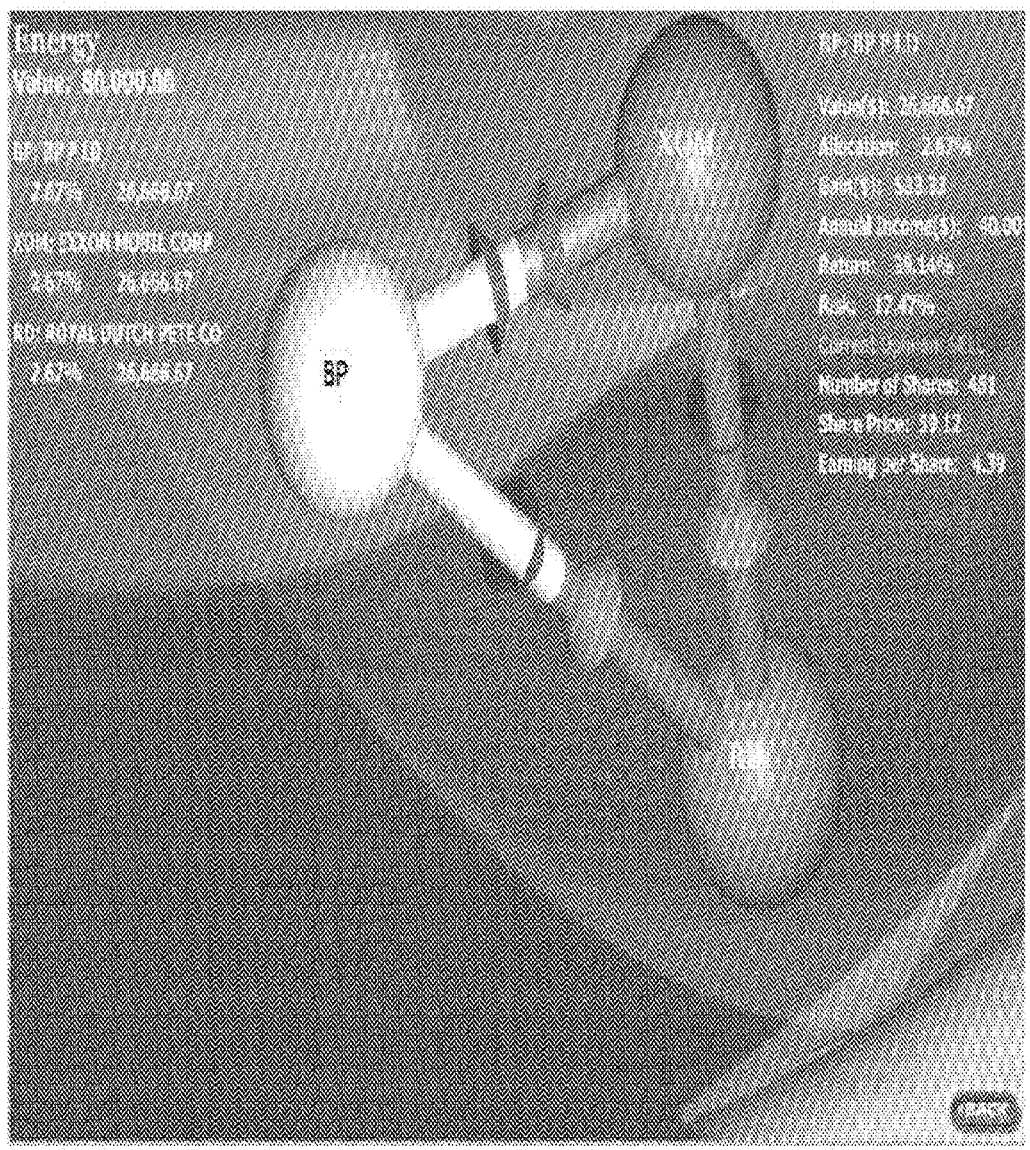

FIG. 10 is a screenshot illustrating one of the methods by which General Model communicates to user parameters having negative implications. This figure presents the second tier of an investment portfolio model. The model employs red color (presented here as white color due to black and white drawing limitations) to indicate warning status for British Petroleum stock.

Feature E of the General Model provides a powerful mechanism for customization: user may select for display any combination of variables from a set of variables describing the financial data of the portfolio according to custom criteria. The user might choose to construct all or part of the dimensions as deviations (for example, first derivatives) based on such criteria (which may include numerical tolerance levels) to communicate to the user a deviation of parameters having negative implications.

Figure 11:
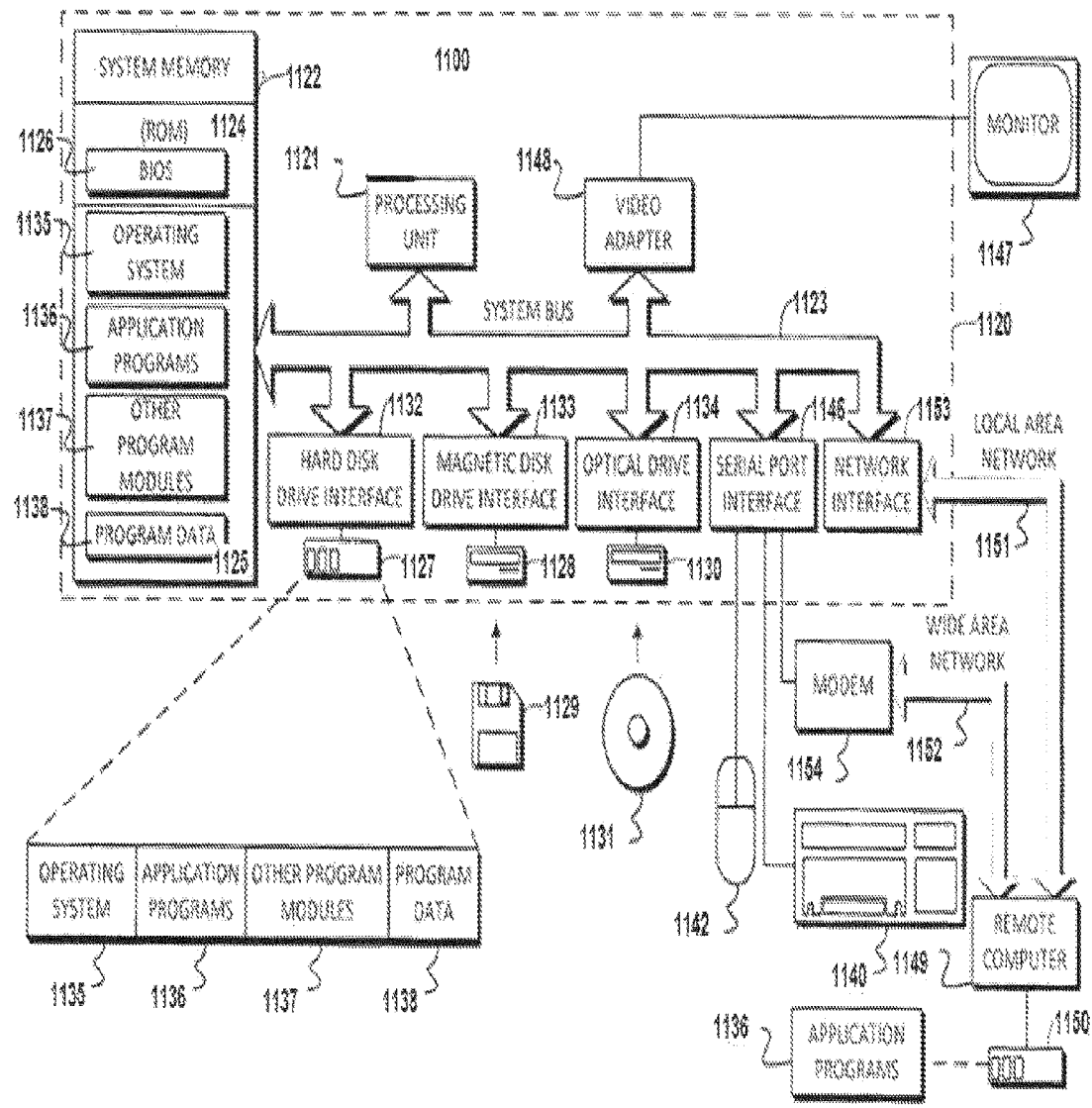
FIG. 11 is a block diagram of an example computer system for storing computer readable instructions and executing instructions for implementing methods according to an example embodiment.

FIG. 11 is a block diagram of a computer system to implement methods according to an example embodiment. In the embodiment shown in FIG. 11, a hardware and operating environment is provided that is applicable to any of the servers and/or remote clients shown in the other Figures.

As shown in FIG. 11, one embodiment of the hardware and operating environment includes a general purpose computing device in the form of a computer 1100 (e.g., a personal computer, workstation, or server), including one or more processing units 1121, a system memory 1122, and a system bus 1123 that operatively couples various system components including the system memory 1122 to the processing unit 1121. There may be only one or there may be more than one processing unit 1121, such that the processor of computer 1100 comprises a single central-processing unit (CPU), or a plurality of processing units, commonly referred to as a multiprocessor or parallel-processor environment. In various embodiments, computer 1100 is a conventional computer, a distributed computer, or any other type of computer.

The system bus 1123 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1124 and random-access memory (RAM) 1125. A basic input/output system (BIOS) program 1126, containing the basic routines that help to transfer information between elements within the computer 1100, such as during start-up, may be stored in ROM 1124. The computer 1100 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media.

The hard disk drive 1127, magnetic disk drive 1128, and optical disk drive 1130 couple with a hard disk drive interface 1132, a magnetic disk drive interface 1133, and an optical disk drive interface 1134, respectively. The drives and their associated computer-readable media provide non volatile storage of computer-readable instructions, data structures, program modules and other data for the computer 1100. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1129, optical disk 1131, ROM 1124, or RAM 1125, including an operating system 1135, one or more application programs 1136, other program modules 1137, and program data 1138. Programming for implementing one or more processes or method described herein may be resident on any one or number of these computer-readable media.

A user may enter commands and information into computer 1100 through input devices such as a keyboard 1140 and pointing device 1142. Other input devices (not shown) can include a microphone, joystick, game pad, satellite dish, scanner, or the like. These other input devices are often connected to the processing unit 1121 through a serial port interface 1146 that is coupled to the system bus 1123, but can be connected by other interfaces, such as a parallel port, game port, or a universal serial bus (USB). A monitor 1147 or other type of display device can also be connected to the system bus 1123 via an interface, such as a video adapter 1148. The monitor 1147 can display a graphical user interface for the user. In addition to the monitor 1147, computers typically include other peripheral output devices (not shown), such as speakers and printers.

The computer 1100 may operate in a networked environment using logical connections to one or more remote computers or servers, such as remote computer 1149. These logical connections are achieved by a communication device coupled to or a part of the computer 1100; other types of communication devices may also be used. The remote computer 1149 can be another computer, a server, a router, a network PC, a client, a peer device or other common network node, and typically includes many or all of the elements described above I/O relative to the computer 1100, although only a memory storage device 1150 has been illustrated. The logical connections depicted in FIG. 11 include a local area network (LAN) 1151 and/or a wide area network (WAN) 1152. Such networking environments are commonplace in office networks, enterprise-wide computer networks, intranets and the internet, which are all types of networks.

When used in a LAN-networking environment, the computer 1100 is connected to the LAN 1151 through a network interface or adapter 1153, which is one type of communications device. In some embodiments, when used in a WAN-networking environment, the computer 1100 typically includes a modem 1154 (another type of communications device) or any other type of communications device, e.g., a wireless transceiver, for establishing communications over the wide-area network 1152, such as the internet. The modem 1154, which may be internal or external, is connected to the system bus 1123 via the serial port interface 1146. In a networked environment, program modules depicted relative to the computer 1100 can be stored in the remote memory storage device 1150 of remote computer, or server 1149. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

REFERENCES

[1] "Modern Portfolio Theory and Investment Analysis" by Edwin J. Elton, Martin J. Gruber, Stephen J. Brown, William N. Goetzmann. Published by Jon Wiley and Sons, 2007.

What is claimed is:

1. A computerized method of displaying financial data, the method comprising:
    receiving financial data in an electronic format in a first computer process stored and executed on a computer;
    analyzing the financial data via the computer to identify assets, parameter values of assets, and relationships between the assets associated with the financial data;
    producing parsed financial data in a second computer process stored and executed on the computer, the parsed financial data identifying the assets, parameter values of assets, and relationships between the assets;
    using the parsed financial data to populate a General Model that includes multiple parameters of assets represented by the financial data including asset values, performance, and covariances or correlations with respect to other assets;
    storing the populated General Model on a computer readable storage device; and
    using a graphics engine executing on the computer to display the populated General Model, representing assets as three dimensional objects having a size representative of asset value and a color representative of a selected performance parameter of the assets, and representing relationships between the objects as three dimensional interconnections coupled to and extending between pairs of the three dimensional objects, the interconnections having a thickness representative of covariance or correlation between the corresponding assets.

2. The computerized method of claim 1 wherein dependencies between assets are calculated by the second computer process as a function of a sum of risks contained in the assets and a sum of risks contained in inter-asset.

3. A non-transitory digital storage medium encoded with instructions, which, when loaded into a computer establish computer processes, for displaying financial data, the processes comprising:

receiving financial data in an electronic format;
analyzing the financial data to identify assets, parameter values of assets, and relationships between the assets associated with the financial data;
producing parsed financial data, the parsed financial data identifying the assets, parameter values of assets, and relationships between the assets;
using the parsed financial data to populate a General Model and storing the populated General Model that includes multiple parameters of assets represented by the financial data including asset values, performance, and covariances or correlations with respect to other assets; and
using a graphics engine to display the populated General Model, representing assets as three dimensional objects having a size representative of asset value and a color representative of a selected performance parameter of the assets, and representing relationships between the objects as three dimensional interconnections coupled to and extending between pairs of the three dimensional objects, the interconnections having a thickness representative of covariance or correlation between the corresponding assets.

4. The non-transitory digital storage medium of claim 3 wherein dependencies between assets are calculated by the second computer process as a function of a sum of risks contained in the assets and a sum of risks contained in inter-asset relationships.

5. The non-transitory digital storage medium of claim 3 wherein the three dimensional objects are spheres, and the interconnections are cylinders coupled between pairs of spheres.

6. The non-transitory digital storage medium of claim 5 wherein a sphere has multiple connections to multiple spheres, each interconnection having a diameter representative of covariance or correlations between assets represented by respective connected spheres.

7. The non-transitory digital storage medium of claim 5 wherein each sphere has a size representative of the value of the asset corresponding to the sphere.

8. The non-transitory digital storage medium of claim 7 wherein each sphere has a color representative of a performance of the asset corresponding to the sphere.

9. The non-transitory digital storage medium of claim 7 wherein each sphere has a text label identifying the corresponding asset.

10. The non-transitory digital storage medium of claim 3 and further comprising calculating a variance of the assets identified in the financial data based on the formula:

$$\sigma_p^2 = \sum_{i=1}^{n} \omega_i^2 \sigma_i^2 + \sum_{i=1}^{n} \sum_{j=i+1}^{n} 2\omega_i \omega_j cov(i, j)$$

where i=1, 2, ...., n, n is a number of assets in the financial data, $\omega_i$ is a weighting of assets, $\sigma_i$ is an asset's return standard deviation, cov (i,j) is a price covariance between assets i and j.

11. The computerized method of claim 1 wherein the three dimensional objects are spheres, and the connections are cylinders coupled between pairs of spheres.

12. The computerized method of claim 11 wherein a sphere has multiple connections to multiple spheres, each connection having a diameter representative of covariance or correlation between assets represented by respective connected spheres.

13. The computerized method of claim 11 wherein each sphere has a size representative of the value of the asset corresponding to the sphere.

14. The computerized method of claim 13 wherein each sphere has a color representative of a performance of the asset corresponding to the sphere.

15. The computerized method of claim 13 wherein each sphere has a text label identifying the corresponding asset.

16. The computerized method of claim 1 and further comprising calculating a variance of the assets identified in the financial data based on the formula:

$$\sigma_p^2 = \sum_{i=1}^{n} \omega_i^2 \sigma_i^2 + \sum_{i=1}^{n} \sum_{j=i+1}^{n} 2\omega_i \omega_j cov(i, j)$$

where i=1, 2, ...., n, n is a number of assets in the financial data, $\omega_i$ is a weighting of assets, $\sigma_i$ is an asset's return standard deviation, cov (i,j) is a price covariance between assets i and j.

17. The method of claim 1 wherein the three dimensional objects are spheres, and the interconnections are cylinders coupled between pairs of spheres.

18. The method of claim 17 wherein a sphere has multiple connections to multiple spheres, each interconnection having a diameter representative of covariance or correlation between assets represented by respective connected spheres.

19. The method of claim 17 wherein each sphere has a size representative of the value of the asset corresponding to the sphere, and wherein each sphere has a color representative of a performance of the asset corresponding to the sphere.

* * * * *